United States Patent [19]

Jung et al.

[11] Patent Number: 5,118,759
[45] Date of Patent: Jun. 2, 1992

[54] POLYCARBONATE MOULDING COMPOSITIONS, THEIR PREPARATION AND THEIR USE

[75] Inventors: Alfred Jung, Krefeld; Karl-Erwin Piejko, Bergisch Gladbach; Werner Nouverné, Krefeld; Ulrich Grigo, Kempen; Christian Lindner, Cologne, all of Fed. Rep. of Germany

[73] Assignee: Bayer Aktiengesellschaft, Leverkusen, Fed. Rep. of Germany

[21] Appl. No.: 573,104

[22] Filed: Aug. 24, 1990

[30] Foreign Application Priority Data

Aug. 30, 1989 [DE] Fed. Rep. of Germany ...... 3928661

[51] Int. Cl.$^5$ .................. C08L 69/00; C08L 33/08; C08L 33/10
[52] U.S. Cl. ................................. 525/148; 525/92
[58] Field of Search ............................. 525/148

[56] References Cited

U.S. PATENT DOCUMENTS

| 3,742,088 | 6/1973 | Holder et al. | 260/873 |
| 4,148,842 | 4/1979 | Yu et al. | 260/873 |
| 4,299,928 | 11/1981 | Witman | 525/67 |
| 4,569,970 | 2/1986 | Paul et al. | 525/67 |
| 4,785,053 | 11/1988 | Ito et al. | 525/146 |
| 4,906,696 | 3/1990 | Fischer | 525/148 |
| 4,950,716 | 8/1990 | Fischer | 525/148 |

FOREIGN PATENT DOCUMENTS

| 1019876 | 10/1977 | Canada . |
| 1109884 | 6/1961 | Fed. Rep. of Germany . |
| 018611 | 1/1968 | Japan . |
| 016063 | 5/1972 | Japan . |
| 1182807 | 3/1970 | United Kingdom . |
| 1394481 | 5/1975 | United Kingdom . |

OTHER PUBLICATIONS

"Makromolekule", H. G. Elias, Huthig & Wepf, Basel-Heidelberg 1971, p. 313.
E. F. Jordan Jr., B. Artymyshyn, A. Speca, A. N. Wrigley, J. Polym Sc. A-1, vol. 9, 3349-3365 and pp. 3367-3378.

Primary Examiner—James J. Seidleck
Assistant Examiner—David Buttner
Attorney, Agent, or Firm—Joseph C. Gil; Richard E. L. Henderson

[57] ABSTRACT

The present invention relates to mixtures containing 1) polycarbonates and 2) specific polymers of $C_{10}$–$C_{40}$-alkyl (meth)acrylates and if appropriate styrenes or $C_1$–$C_4$-alkyl methacrylates, and if appropriate customary additives, the preparation of these mixtures and their use for the production of petrol-resistant shaped articles.

5 Claims, No Drawings

POLYCARBONATE MOULDING COMPOSITIONS, THEIR PREPARATION AND THEIR USE

The present invention relates to mixtures containing
(1) 85 wt. % to 99.9 wt. %, preferably 88 wt. % to 99.5 wt. % and in particular 90 wt. % to 99 wt. % thermoplastic aromatic polycarbonates and
(2) 15 wt. % to 0.1 wt. %, preferably 12 wt. % to 0.5 wt. % and in particular 10 wt. % to 1 wt. % non-cross-linked thermoplastic polymers having mean weight-average molecular weights $\overline{M}_w$ (determined, for example, by scattered light measurement) of 2,000 to 500,000 g/mol, preferably 5,000 to 200,000 g/mol, which are characterized in that the polymers (2) are prepared from:
(2.1) $C_{10}$-$C_{40}$-alkyl (meth)acrylates in a known manner, wherein
(2.2) up to 90 wt. %, preferably 0 wt. % to 85 wt. % and in particular 10 wt. % to 80 wt. % component (2.1) can be replaced by styrenes, or wherein
(2.3) up to 60 wt. %, preferably 10 wt. % to 50 wt. % component (2.1) can be replaced by $C_1$-$C_4$-alkyl methacrylates,
and wherein the polymers (2) must have a brittle temperature above +2° C., preferably above +10° C.

Preferred alkyl esters of (meth)-acrylic acid according to (2.1) are those of $C_{12}$-$C_{30}$-alcohols, in particular of $C_{14}$-$C_{24}$-alcohols and especially of $C_{16}$-$C_{26}$-alcohols.

The mixtures according to the invention are distinguished by a high resistance to motor fuel, where appropriate combined with an improved low temperature toughness.

COMPONENT (1)

Thermoplastic aromatic polycarbonates which are suitable according to the invention are those based on the diphenols of the formula (I)

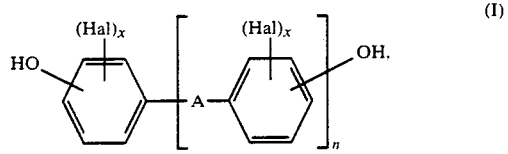

wherein
A is a single bond, a $C_1$-$C_5$-alkylene, a $C_2$-$C_5$-alkylidene, a $C_5$-$C_6$-cycloalkylidene, —S— or —$SO_2$—,
Hal is chlorine or bromine,
x is 0, 1 or 2 and
n is 1 or zero,
and if appropriate of the formula (Ia)

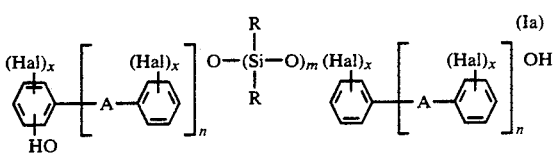

in which
A is Hal,
x and n have the meaning given for formula (I) and the

R's are identical or different and are a linear $C_1$-$C_{20}$-alkyl, branched $C_3$-$C_{20}$-alkyl or $C_6$-$C_{20}$-aryl, preferably $CH_3$, and
m is an integer between 5 and 200, preferably between 10 and 150 and in particular between 20 and 80.

The radicals R can be monosubstituted or partly or completely substituted by fluorine, chlorine or bromine.

Polycarbonates according to component (1) which are suitable according to the invention are both homopolycarbonates and copolycarbonates, the diphenols of the formula (Ia) being employed only for the preparation of copolycarbonates with the diphenols of the formula (I), in which case the weight content of diphenols of the formula (Ia) in the copolycarbonates is in each instance between 1 and 20 wt. %, preferably between 1.5 and 15 wt. % and in particular between 2 and 10 wt. %, in each case based on the total weight of the diphenols employed of the formula (I) and (Ia).

The copolycarbonates from the diphenols (Ia) and (I) are preferred according to the invention as polycarbonate component (1).

The diphenols of the formula (I) either are known from the literature or can be prepared by processes which are known from the literature; polydiorganosiloxanes having hydroxy-aryloxy end groups according to formula (Ia) are likewise known (see, for example, U.S. Pat. No. 3,419,634 in combination with U.S. Pat. No. 3,189,662), or can be prepared by processes which are known from the literature.

The preparation of the polycarbonates according to component (1) which are suitable according to the invention is known from the literature and can be carried out, for example, with phosgene by the phase interface process or with phosgene by the process in a homogeneous phase (the so-called pyridine process), the particular molecular weight to be established being achieved in a known manner by a corresponding amount of known chain stoppers. (As regards polycarbonates containing polydiorganosiloxanes, see, for example, DE-OS 3 334 782 and EP-A-O 122 535.)

Their improved mechanical properties at lower temperatures are described in the relevant literature [see, for example, B. M. Beach, R. P. Kambour and A. R. Schultz, J. Polymer Sci., Polym. Lett. Ed. 12, 247 (1974)].

Examples of suitable chain stoppers are phenol, p-chlorophenol, p-tert.-butylphenol or 2,4,6-tribromophenol, and also long-chain alkylphenols, such as 4-(1,3-tetramethyl-butyl)-phenol, according to DE-OS 2 842 005, or monoalkylphenols or dialkylphenols having a total of 8 to 20 C atoms in the alkyl substituents, according to German Offenlegungsschrift 3 506 472 (Le A 23 654), such as, for example, p-nonylphenol, 3,5-di-tert.-butylphenol, p-tert.-octylphenol, p-dodecylphenol, 2-(3,5-dimethylheptyl)-phenol and 4-(3,5-dimethylheptyl)-phenol.

The amount of chain stoppers is preferably 1 mol % to 10 mol %, in each case based on the number of mol of diphenols.

The polycarbonates according to component (1) which are suitable according to the invention have mean weight-average molecular weight ($\overline{M}_w$, measured, for example, by ultracentrifugation or scattered light measurement) of 10,000 to 200,000 g/mol, preferably 20,000 to 80,000 g/mol.

Examples of suitable diphenols of the formula (I) are hydroquinone, resorcinol, 4,4'-dihydroxydiphenyl, 2,2- bis-(4-hydroxyphenyl)-propane. 2,4-bis-(4-hydroxyphenyl)-2-methylbutane, 1,1-bis-(4-hydroxyphenyl)cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable diphenols of the formula (Ia) are those in which R is methyl, ethyl, propyl, n-butyl, tert.-butyl, phenyl, chloromethyl, trifluoropropyl, chlorophenyl or naphthyl. Preferred diphenols (Ia) are those wherein R is methyl, as already mentioned. Particularly preferred diphenols of the formula (Ia) are those of the formula (Ib)

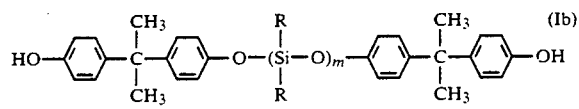

wherein the

R's are identical and have the abovementioned meaning, that is to say denote methyl etc. or naphthyl, and m in turn is an integer between 5 and 200, preferably between 10 and 150 and in particular between 20 and 80.

The polycarbonates according to component (1) which are suitable according to the invention can be branched in a known manner, and in particular preferably by incorporation of 0.05 to 2.0 mol %, based on the sum of diphenols employed, of compounds which are trifunctional or more than trifunctional, for example those having three or more than three phenolic OH groups. Such branching agents are known (see, for example, DE-OS 1 570 533, DE-OS 1 595 762 and U.S. Pat. No. 3,544,514).

Examples of suitable branching agents are:
2,4-bis-(4-hydroxyphenyl-isopropyl)-phenol, 2,6-bis-(2'-hydroxy-5'-methylbenzene)-4-methylphenol, 2-(4-hydroxyphenyl)-2-(2,4-dihydroxyphenyl)-propane, 1,4-bis-(4,4'-dihydroxytriphenyl-methyl)-benzene, 2,4-dihydroxybenzoic acid, trimesic acid, cyanuric chloride, 3,3-bis-(4-hydroxyphenyl)-2-oxo-2,3-dihydroindole and 3,3-bis-(4-hydroxy-3-methyl-phenyl)-2-oxo-2,3-dihydroindole.

Preferred polycarbonates are characterized in that the polycarbonate is a polydiorganosiloxane-polycarbonate block cocondensate having a relative viscosity (measured on a solution of 0.5 g block cocondensate in 1 dl methylene chloride at 25° C.) of 1.15 to 1.38, preferably 1.20 to 1.35, and has a content of polydiorganosiloxane units resulting from the above-mentioned amounts of cocondensed diphenols of the formula (Ia).

Polycarbonate components (1) which are particularly preferred according to the invention are polydiorganosiloxane-polycarbonate block cocondensates which contain, as diphenols (I), the preferred concondensed diphenols (I) already mentioned, and contain, as diphenols of the formula (Ia), those cocondensed diphenols of the formula (Ib).

The polycarbonate component (1) to be employed according to the invention can also be a mixture of various polycarbonates of the diphenols (I) and if appropriate (Ia), it also being possible for a copolycarbonate of (I) and (Ia) which contains more than 20 wt. % cocondensed diphenols (Ia) to be employed as a component of the mixture as long as the proportion according to the invention of cocondensed (Ia) of the total amount of polycarbonates of component (1) in turn lies within the abovementioned limits of 1 wt. % to 20 wt. %.

COMPONENT (2)

The thermoplastic polymers to be employed according to the invention are either already known as such or are obtainable by known processes (see, for example, GB-OS 2 076 171 or DE-AS 2 724 360).

The $C_{10}$–$C_{40}$-alkyl radicals in the monomers (2.1) can be linear or branched and unsaturated or saturated, linear saturated $C_{10}$–$C_{40}$-alkyl radicals being preferred. Examples of suitable alkyl radicals are octadecyl, 1-eicosanyl and 1-docosanyl.

Examples of preferred monomers (2.1) are stearyl acrylate, behenyl acrylate or 1-docosanyl acrylate and eicosanyl acrylate, and the corresponding esters of methacrylic acid, such as stearyl methacrylate, 1-docosanyl methacrylate and eicosanyl methacrylate.

Suitable monomers (2.2) are styrene, α-methylstyrene, p-methylstyrene or p-chlorostyrene.

Suitable monomers (2.3) are methyl methacrylate, ethyl methacrylate, propyl methacrylate, iso-propyl methacrylate, butyl methacrylate and iso-butyl methacrylate.

Preferred monomers (2.2) or (2.3) are styrene, p-methylstyrene and methyl methacrylate.

The non-crosslinked polymers (2) of the monomers (2.1) and if appropriate (2.2) and of the monomers (2.1) and (2.3) should have brittle temperatures above +2° C., preferably above +10° C.

In the case of purely amorphous polymers, the brittle temperatures are to be equated with the glass transition temperatures thereof (for glass transition temperatures of polymers, see "Polymer Handbook", 2nd ed., Wiley & Sons, New York 1975, p. III/139f). However, polymers containing the monomers (2.1) can be in partly crystalline form from certain C chain lengths of the alcohol radicals of the monomers (2.1) and from certain contents of the monomers (2.1); in these cases, the brittleness of the polymers is also influenced by the amount of crystalline portions and the melting temperature thereof (for the brittle temperatures of homopoly(meth)acrylic acid esters see H. G. Elias, "Makromolekule (Macromolecules)", Hüthig & Wepf, Basel-Heidelberg 1971, p.313; for the glass transition temperatures and melting temperatures of copolymers with monomers capable of crystallization (with the examples octadecyl acrylate/methyl acrylate) see E. F. Jordan jr., B. Artymyshyn, A. Speca, A. N. Wrigley, J. Polym. Sci. A-1, Vol.9, 3349–3365 (1971) and E. F. Jordan jr., ibid, 3367–3378).

The composition of the polymers (2) containing monomers (2.1) which can have different C chain lengths of the alcohol radicals and if appropriate monomers (2.2) or (2.3) must in all cases be chosen so that the glass transition temperature of the polymers is above +2° C., preferably above +10° C., or that the C chain lengths of the alcohol radicals of the monomers (2.1) are long enough and the contents of these monomers in the polymer are high enough for the polymers to contain crystalline phases and therefore not to be elastomers.

The glass transition temperatures of the polymers or the presence of crystalline phases can be determined, for example, by differential thermal analysis.

Component (2) can be prepared by any desired polymerization process in bulk, solution, water, suspension, dispersion and emulsion by free radicals, heat or ions. Component (2) is preferably prepared in bulk or in emulsion.

In the case of the preferred emulsion polymerization, a procedure is preferably followed in which a pre-emulsion is prepared from a solution of the monomers (2.1) and if appropriate (2.2) or (2.3), which contains up to 100 wt. %, preferably up to 50 wt. % and in particular up to 25 wt. %, based on the total weight of monomers of component (2) which are to be polymerized, of an inert organic solvent, and an aqueous solution of suitable emulsifiers by means of stirrer units or emulsifying machines, for example homogenizers, or by means of atomization.

Corresponding emulsifying units are known to the expert. Suitable emulsifiers are anionic, cationic or non-ionic emulsifers, such as, for example, higher aliphatic fatty acids, organic sulphonic acids or sulphuric acid half-esters, alkylammonium salts, polyethoxylated phenol derivatives or aliphatic polyethoxylated polyether block polymers. The ratio of the aqueous to the organic phase of the pre-emulsion can be varied within wide limits here; the ratio of the aqueous to the organic phase is preferably between 9/1 and 1/1. The pre-emulsion is then polymerized continuously, semi-continuously or batchwise with the aid of customary free radical initiators using the customary conditions.

The adjustment of the molecular weight of component (2) can be achieved by various measures, such as temperature, monomer concentration, amount of starter or the use of so-called regulators, such as organosulphur compounds, for example mercaptans and/or disulphides, long-chain mercaptans, such as n- or tert.-dodecylmercaptans being advantageous.

The regulators are usually dissolved in the monomer mixture and the mixture is then polymerized. Such an adjustment of the molecular weight of vinyl polymers is familiar to the expert.

Prior art

Moulding compositions of polycarbonates and polymers of alkenylaromatic compounds are known from DE-AS 1 109 884. The moulding compositions have a better processability.

Mixtures of polycarbonates with polymethyl methacrylates are likewise known (see, for example, GB-PS 1 182 807 and JA 72/16063).

Mixtures of polycarbonates with crosslinked (meth)acrylate polymers are likewise known (see, for example, U.S. Pat. No. 4,148,842).

Mixtures of polycarbonates with acrylic rubber interpolymers are likewise known (see U.S. Pat. No. 4,299,928). Thermoplastic phases based on $C_1$-$C_{16}$-(meth)acrylates are involved here (column 3, lines 65 et seq. of U.S. Pat. No. 4,299,928).

Japanese Published Specification no. 18 611/68 discloses polycarbonates containing 2 to 40 parts of polyacrylic acid esters or copolymers of acrylic acid esters with other vinyl monomers. The aim of these mixtures is improvement in the impact strength and resistance to stress cracking of the polycarbonates and resistance of these to hot water and heat. Polyoctyl acrylates are also mentioned as acrylic acid esters.

Other vinyl monomers which are mentioned are, inter alia, styrene and methacrylic acid esters, which can be polymerized with the acrylic acid esters in amounts of less than 50 mol %. The aim of the subject matter of JA 18 611/68 is not to improve the resistance to petrol.

Mixtures of polycarbonates with elastomers which have a glass transition temperature of less than 0° C. are known from U.S. Pat. No. 3,742,088. Copolymers of butyl acrylates with stearyl acrylates and lauryl($C_{12}$) methacrylaye rubbers are also involved as elastomers. The amount of stearyl acrylates in the copolymers is 20 wt. % (claim 5 of U.S. Pat. No. 3,742,088).

The butyl acrylate/stearyl acrylate copolymer (wt. ratio 80/20) employed in the examples of U.S. Pat. No. 3,742,088 has a glass transition temperature of −60° C. to −70° C. (Table I, example 5), and the lauryl methacrylate rubber employed has a glass transition temperature of −75° C. (Table II). The notched impact strength of the polycarbonates is said to be improved by the addition of the elastomers.

Mixtures of polycarbonates with acrylic acid copolymers are known from GB-PS 1 394 481. The copolymers consist of 90 to 75 wt. % methyl methacrylate and 10 to 25 wt. % (meth)acrylates of $C_4$-$C_{12}$-alcohols. The aim of the mixtures is a reduced melt viscosity, associated with improved processability and improved stability towards discoloration.

An improvement in the resistance to petrol is also not mentioned in the GB-PS.

Mixtures of polycarbonates with polyacrylate elastomers are known from DE-OS 2 303 190; the acrylic acid esters are those which have 2 to 8 C atoms in the alkyl radical. A reduced notch width sensitivity is said to be achieved with the mixtures of DE-OS 2 303 190.

Mixtures based on polysiloxane-polycarbonate block copolymers are known from DE-OS 3 347 071, on the one hand it being possible to add thermoplastic copolymers [component (c)] which are prepared, inter alia, from styrenes and/or methyl methacrylate (page 13, lines 11 et seq. of DE-OS 3 347 071), and on the other hand it being possible to add rubber-elastic polymers having a glass transition temperature below −20° C. [component (d)], which include, inter alia, copolymers based on $C_1$-$C_{18}$-alkyl alcohol-(meth)acrylates (see page 21 of DE-OS 3 347 071).

The aim of the addition of the rubber-elastic polymers is a high heat distortion temperature, tough-brittle transition at lower temperatures and a certain resistance to petrol, which can be improved further by addition of polyalkylene terephthalate.

Mixtures of various thermoplastics which are blended under optical aspects in order to achieve no birefringence in total are known from EP-A-O 199 824. Aromatic polycarbonates on the one hand and (meth)acrylates of higher alcohols, such as cetyl($C_{16}$) methacrylate or octadecyl acrylate, can be employed as the thermoplastic components. The polycarbonates are classified here as positively "polarizing" and the (meth)acrylates of higher alcohols as negatively "polarizing" (page 7, paragraph 3, to page 8, paragraph 1 of the EP-A). No concrete mixing ratios of the various "polarizing" thermoplastics are mentioned in the description or claims.

In the examples (Table 1, page 17 of EP-A 0 199 824), a maximum of 83.5 parts of polycarbonate are employed in combination with 21.5 parts of styrene resins (as is known, the block copolymer consists of 30% polystyrene and 70% polycarbonate according to example 1 of EP-A 0 199 824). The weight ratios are thus a maximum of 79.5% polycarbonate to 20.5% polystyrene, that is to say clearly outside the lower limit of 85 wt. % polycarbonate (1) to 15 wt. % polymer (2) claimed by ourselves.

The subject matter of our invention is thus not anticipated by or obvious from the doctrine of EP-A 0 199 824, since the aim of the doctrine of EP-A 0 199 824 is to provide mixtures which are based on polycarbonate and are resistant to motor fuel and if appropriate tough at low temperatures.

The present invention thus also relates to the use of the mixtures according to the invention for the production of shaped articles which are resistant to petrol, that is to say those which come into contact with all types of motor fuels, in particular car components, aircraft components, ship components and every type of seals, for petrol and oil lines, pump units etc.

The mixtures according to the invention can contain customary additives chosen from processing auxiliaries, such as e.g. flow control and mould release agents, fillers and reinforcing agents, such as e.g. talc, chalk or glass fibres, coloured pigments, such as e.g. titanium dioxide or carbon black, and/or also fireproofing agents, such as e.g. halogen compounds, antimony oxide, sulphonates etc.

The present invention thus also relates to mixtures containing components (1) and (2) and additionally an additive chosen from processing auxiliaries, fillers, reinforcing agents, coloured pigments and fireproofing agents.

The mixtures according to the invention are preferably prepared from the components in extruders. However, kneaders, mills or stirring vessels are also suitable for the preparation.

To prepare the mixtures according to the invention, it may be appropriate first to prepare a concentrate of components (1) and (2) and to dilute this to the desired content of (2) using a larger amount of (1). The concentrates can be prepared in the abovementioned mixing units at temperatures between 50° C. and 320° C., preferably 150° C. and 320° C.

The preparation of the mixtures by joint devolatilization extrusion of the mixture components from a mixture of the particular solutions in aliphatic and aromatic halogenohydrocarbons, such as methylene chloride and monochlorobenzene, via suitable extruders with a device for preliminary vaporization is moreover possible.

The present invention thus also relates to a process for the preparation of the mixtures according to the invention containing the components (1) and (2) and if appropriate an additive chosen from processing agents, fillers, reinforcing agents, coloured pigments and/or fireproofing agents, which is characterized in that components (1) and (2) and if appropriate at least one of the additives mentioned are mixed simultaneously or successively either in the melt or in solution in a known manner and the mixture is then isolated in the customary manner.

The moulding compositions of the present inventin can be used for the production of all types of shaped articles by known processes. Shaped articles can be produced, in particular, by extrusion or injection moulding on the units customary for these processes.

Examples of shaped articles which can be produced are, in addition to those already mentioned, vehicle body components and housing components, for example for electrical appliances, apparatuses such as domestic appliances and sheets and films for the construction sector and electrical sector.

EXAMPLES

Interpolymers A $A_1$:

A mixture of 700 g stearyl methacrylate, 700 g styrene and 3 g tert.-dodecylmercaptan is emulsified in a solution of 25 g sodium salt of $C_{14}$–$C_{18}$-alkylsulphonic acids in 2,810 g water with the aid of a high-speed stirrer.

One fifth of this emulsion is heated to 75° C., while stirring and under a gentle stream of nitrogen, and a solution of 6 g potassium peroxodisulphate in 140 g water is added. The remainder of the emulsion and a solution of 12 g sodium salt of $C_{14}$–$C_{18}$-alkylsulphonic acids in 400 g water are metered in uniformly at 75° C. in the course of two hours. The polymerization is then brought to completion at 75° C. for four hours. A latex having a solids content of 29 wt. % is obtained.

After addition of 12 g phenolic antioxidant, the polymer is coagulated with aqueous magnesium sulphate solution, washed and dried. 1,380 g polymer powder having an L value of 55 are obtained.
(L value = $(\eta_{rel} - 1)/0.005$;
where $\eta_{rel}$ = relative solution viscosity, measured in dimethylformamide at 25° C. and a concentration of 0.005 g/cm$^3$)

$A_2$–$A_5$ and comparison polymer $A_6$:

To prepare the polymers $A_2$–$A_5$ and the comparison polymer $A_6$, the following monomer mixtures are employed for preparation of the emulsion and subsequent polymerization analogously to the preparation of $A_1$ (time for completion of the polymerization for $A_3$: 10 hours):

| | |
|---|---|
| $A_2$: | 700 g styrene |
| | 700 g docosanyl acrylate |
| | 3 g tert.-dodecylmercaptan |
| $A_3$: | 1,400 g stearyl methacrylate |
| | 7 g tert.-dodecylmercaptan |
| $A_4$: | 980 g styrene |
| | 420 g stearyl methacrylate |
| | 3 g tert.-dodecylmercaptan |
| $A_5$: | 1,078 g styrene |
| | 322 g stearyl methacrylate |
| | 3 g tert.-dodecylmercaptan |
| $A_6$: | 1,400 g styrene |
| | 3 g tert.-dodecylmercaptan |

Polycarbonate types

1. Polycarbonate based on bisphenol A having a relative solution viscosity of 1.28.
2. Copolycarbonate based on bisphenol A and 5 wt. % polydimethylsiloxane of average block length ($P_n$) 80 having a relative solution viscosity of 1.29, prepared using phenol as the chain stopper in accordance with DE-OS 3 334 782.

Production of test specimens and testing

The test specimens were produced on an injection moulding unit at a material temperature of 310° C.

To determine the resistance to petrol, test specimens of dimensions 80 mm × 10 mm × 4 mm were produced and were clamped on bending templates of different radii of curvature so that outer fibre strains of $\epsilon_R$ of 0.4% and 1.0% result. The templates with the sample applied were kept in a heating cabinet at 70° C. for 15 minutes (with air turbulence in accordance with DIN 50 011, 2, 3).

The templates with the samples were removed from the cabinet and immediately thereafter placed on a cotton-wool pad impregnated with test motor fuel. White spirit according to DIN 51 604 composed of 50 vol. % toluene, 30 vol. % isooctane, 15 vol. % diisobutylene and 5 vol. % ethanol was used as the test motor fuel. After an action time of 15 minutes, the cotton-wool pad was removed and a further 15 minutes elapsed in order to allow the sample to air.

The test specimens were then evaluated with the naked eye as follows:

| Level | Feature |
| --- | --- |
| 1 | no visible change |
| 2 | surface matted |
| 3 | fine cracks |
| 4 | large cracks, fracture. |

The composition of the moulding compositions investigated and the test result are summarized in the following tables:

TABLE 1

| | wt. % | | | | | |
| Example | 1a)* | 1b) | 1c) | 1d)* | 1e) | 1f) |
| --- | --- | --- | --- | --- | --- | --- |
| Polycarbonate | 100 | 94 | 94 | — | — | — |
| Siloxane copolycarbonate | — | — | — | 100 | 94 | 94 |
| Component $A_1$ | — | 6 | — | — | 6 | — |
| Component $A_2$ | — | — | 6 | — | — | 6 |
| Petrol test | | | Evaluation | | | |
| Outer fibre strain | | | | | | |
| $\epsilon_R = 0.4\%$ | 3 | 2 | 2 | 3 | 2 | 2 |
| $\epsilon_R = 1.0\%$ | 4 | 2 | 2 | 4 | 2 | 2 |

*not according to the invention

TABLE 2

| | wt. % | | | | | | | |
| Example | 2a) | 2b) | 2c) | 2d) | 2e) | 2f) | 2g)* | 2h)* |
| --- | --- | --- | --- | --- | --- | --- | --- | --- |
| Polycarbonate | 94 | — | 94 | — | 94 | — | 94 | — |
| Siloxane copolycarbonate | — | 94 | — | 94 | — | 94 | — | 94 |
| Component $A_3$ | 6 | 6 | — | — | — | — | — | — |
| Component $A_4$ | — | — | 6 | 6 | — | — | — | — |
| Component $A_5$ | — | — | — | — | 6 | 6 | — | — |
| Component $A_6$ | — | — | — | — | — | — | 6 | 6 |
| Petrol test | | | | Evaluation | | | | |
| Outer fibre strain | | | | | | | | |
| $\epsilon_R = 0.4\%$ | 2 | 2 | 2 | 2 | 2 | 2 | 3 | 3 |
| $\epsilon_R = 1.0\%$ | 2 | 2 | 2 | 2 | 2 | 2 | 4 | 4 |

*not according to the invention

What is claimed is:

1. A molding composition comprising:
   (1) 85 to 99.5 wt. % of a thermoplastic polycarbonate resin, and
   (2) 15 to 0.1 wt. % of a non-crosslinked thermoplastic polymeric resin having a weight average molecular weight of 2,000 to 500,000 and having a brittle temperature above ±2° C., wherein said polymeric resin is prepared from $C_{10}$–$C_{40}$-alkyl (meth)acrylates, with the proviso that up to 90 wt. % of said $C_{10}$–$C_{40}$-alkyl (meth)acrylate can be replaced by styrene or up to 60 wt. % of said $C_{10}$–$C_{40}$-alkyl (meth)acrylate can be replaced by $C_1$–$C_4$-alkyl methacrylates.

2. A molding composition according to claim 1 comprising 90 to 99 wt. % of said polycarbonate resin (1) and 10 to 1 wt. % of said non-crosslinked thermoplastic polymeric resin (2).

3. A molding composition according to claim 1 wherein said non-crosslinked thermoplastic polymeric resin (2) is prepared from a $C_{16}$–$C_{26}$-alkyl (meth)acrylate.

4. The composition of claim 1 further comprising at least one member selected from the group consisting of a processing auxiliary, filler, reinforcing agent, pigment and fire retarding agent.

5. A molded article prepared from the composition of claim 1, characterized in its improved resistance to petrol.

* * * * *